United States Patent [19]

Milliser

[11] Patent Number: 4,637,766
[45] Date of Patent: Jan. 20, 1987

[54] CLINCH TYPE FASTENER
[75] Inventor: John Milliser, Rochester, Ind.
[73] Assignee: Textron Inc., Providence, R.I.
[21] Appl. No.: 745,623
[22] Filed: Jun. 17, 1985
[51] Int. Cl.$^4$ ............................................. F16B 37/04
[52] U.S. Cl. ................................... 411/180; 411/188
[58] Field of Search ............... 411/111, 113, 179, 180, 411/181, 184, 185, 186, 187, 188, 189

[56] References Cited

U.S. PATENT DOCUMENTS

| | | | |
|---|---|---|---|
| 2,049,259 | 7/1936 | Greenwell | 411/399 |
| 2,486,769 | 11/1949 | Watson | 411/181 X |
| 3,120,254 | 2/1964 | Waltimire et al. | 411/188 |
| 3,125,146 | 3/1964 | Rosan | 411/180 |
| 3,127,919 | 4/1964 | Swanstrom | |
| 3,213,914 | 10/1965 | Baumck et al. | 411/179 |
| 3,234,987 | 2/1966 | Hentzi | 411/179 |
| 3,399,705 | 9/1968 | Breed et al. | |
| 3,405,752 | 10/1968 | Newschotz | 411/180 |
| 3,770,037 | 11/1973 | Ernest | |
| 3,782,436 | 1/1974 | Steiner | |
| 3,967,669 | 7/1976 | Egner | |
| 4,223,711 | 9/1980 | Tabor | 411/185 X |
| 4,470,736 | 9/1984 | Tasseron | 411/188 X |

FOREIGN PATENT DOCUMENTS

WO82/02579 8/1982 PCT Int'l Appl. ................. 411/184

Primary Examiner—Thomas J. Holko
Attorney, Agent, or Firm—Trexler, Bushnell & Wolters, Ltd.

[57] ABSTRACT

A self-clinching fastener of the type for connection to a workpiece comprising sheet material, includes a head and a shank, with a groove formed in the shank, with the head being embeddable in the sheet material to displace material thereof into the groove to form a mechanical interlock between the material of the sheet material and the fastener. The head includes a plurality of radially disposed projections extending axially outwardly of an undersurface thereof and intermediate the undersurface and the groove. These projections each include an axially facing recess therein, such that the material of the workpiece being displaced will flow into the groove and the recesses in the projections, to lock the fastener to the workpiece. The shank may also include an extruding portion to resize an aperture in the sheet material, prior to the deforming of said sheet material by said head.

7 Claims, 8 Drawing Figures

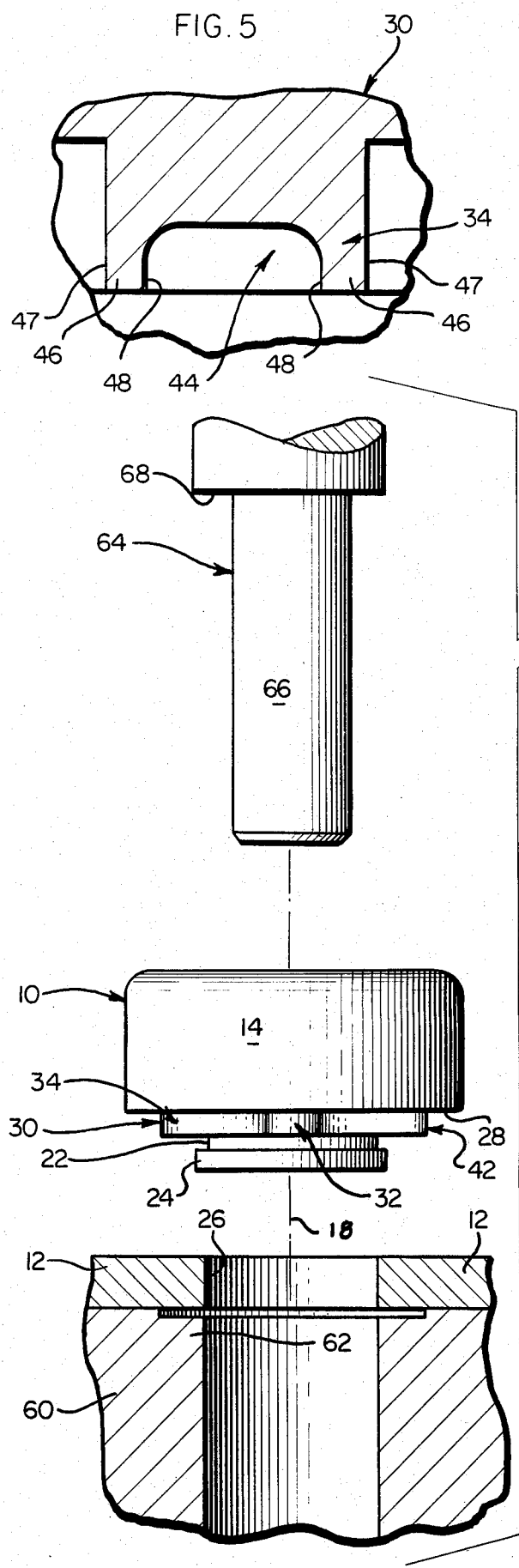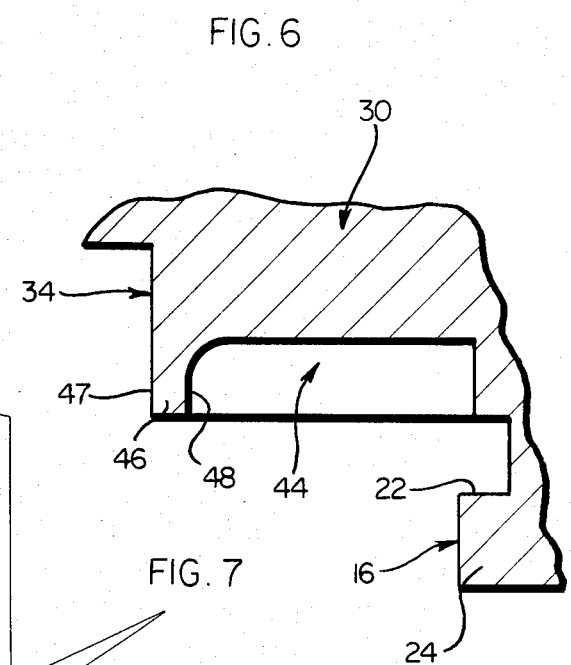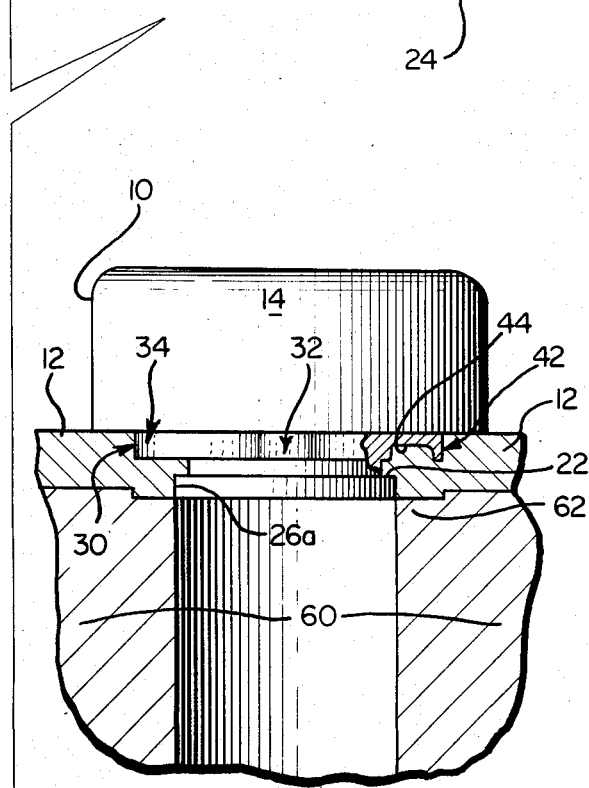

CLINCH TYPE FASTENER

BACKGROUND OF THE INVENTION

The present invention relates to self-clinching or clinch type fasteners, and more particularly concerns an improved form of such a fastener employing novel projections to assure a predicted and predetermined locking action with a relatively thin sheet material workpiece.

Clinch type or self-clinching fasteners are well-known in the art and employ a number of clinching or staking structures and methods. These prior art fasteners are primarily of the type which are assembled in a pre-punched hole or aperture in a work piece comprising sheet material. Thereupon, the head portion of these fasteners is seated and embedded in the facing surface of the sheet material to cause some displacement of the sheet material. This displacement results in some cold flow of amterial about the surfaces of the fastener, which are formed in a fashion so as to receive and interlock with this material of the sheet or workpiece. The mechanical interlocking obtained provides a means for maintaining the fastener in a fixed and non-rotatable engagement with the sheet material, for example, to receive a mating fastener.

One particularly advantageous type of prior art clinch type fastener is shown in U.S. Pat. No. 3,967,669 to which reference is invited. Clinch type fasteners made in accordance with this patent advantageously utilizes an axially leading extruding portion which serves to size or rework a pre-existing or pre-punched aperture in the sheet of material. Accordingly, an axially following locking groove is thereby placed within an aperture of predicted size, having been preformed by the leading extruding portion. As an additional advantage, the fastener of this patent provides radially disposed projections extending axially from the head and toward the groove, these projections being sized fo displacing a volume of material of the sheet into the groove. These radial projections also serve to prevent rotation of the fastener relative to the sheet material, once embedded therein.

In fabricating the above-discussed fastener, difficulty has been encountered in attaining the desired dimensional configuration for the radial projections. The problem has become especially acute with respect to relatively small fasteners. In this regard, there is some "trade-off" which occurs between the radial extent of the projections, for preventing relative rotation, and the overall volume of the projections, which corresponds to the volume of material displaced thereby into the groove. That is, when working with relatively thin sheet material, only a relatively small amount of material is to be displaced into the groove. However, in the cold forming of the projections it is difficult to displace sufficient material to fill out the desired projection profile. As such, projections result which have an insufficient radial extent to provide the desired degree of resistance to torque or rotation relative to the workpiece or sheet of material once the fastener is embedded therein. On the other hand, increasing the size of the radial projections tends to result in too great a volume being displaced upon seating of the fastener, such that the volume of material displaced thereby tends to overfill the groove. Such overfilling is undesirable, in that it is unsightly and leaves a rough exterior that may require machining.

More specifically, with the present invention the exposed undersurface of the projections or lobes is relieved. Thus, upon cold forming of the metal during fabrication of the projections it is assured that material will be displaced or forced radially outward to form the desired lobe profile or configuration. Also, the relieved configuration of the lobes are such that when embedded in a workpiece or section of sheet material additional edge surfaces are available to resist rotation of the fastener.

OBJECTS AND SUMMARY OF THE INVENTION

Accordingly, it is a general object of the invention to provide a novel and improved self-clinching fastener which avoids the foregoing problems.

A more specific object is to provide a self-clinching fastener in accordance with the foregoig object which includes radial projections designed to obtain optimal resistance to rotation relative to the workpiece, while displacing a volume of material of the workpiece into the locking groove.

A related object is to provide a self-clinching fastener in accordance with the foregoing objects which is relatively simple and inexpensive in its design and manufacture and yet highly reliable in operation.

Briefly and in accordance with the foregoing objects, the invention provides a fastener including a head and a shank, with a groove formed in said shank, with said head being embeddable in said sheet material to displace material thereof into said groove to form a mechanical interlock between the material of said sheet material and said fastener. The head including a plurality of radially disposed projections extending axially outwardly of an undersurface thereof and intermediate said undersurface and said groove; said projections including a plurality of recesses therein, such that the net volume of said projections is preferably equal to or slightly greater than the volume of the groove, said head being embeddable in said workpiece with material of the workpiece bieng displaced into said groove by said projections, and said material also filling the projection recesses.

BRIEF DESCRIPTION OF THE DRAWINGS

The features of the present invention which are believed to be novel are set forth with particularity in the appended claims. The organization and manner of operation of the invention, together with further features and advantages thereof may best be understood by reference to the following description taken in connection with the accompanying drawings in the several figures of which like reference numerals identify like elements and in which:

FIGS. 5 and 6 are partial sectional views taken generally in the planes of lines 5—5 and 6—6, respectively, of FIG. 2;

FIGS. 7 and 8 are partial sectional views, FIG. 7 being exploded, illustrating the method or steps employed in attaching the fastener of the invention to relatively thin sheet material.

DETAILED DESCRIPTION OF THE ILLUSTRATED EMBODIMENT

Figure 1:
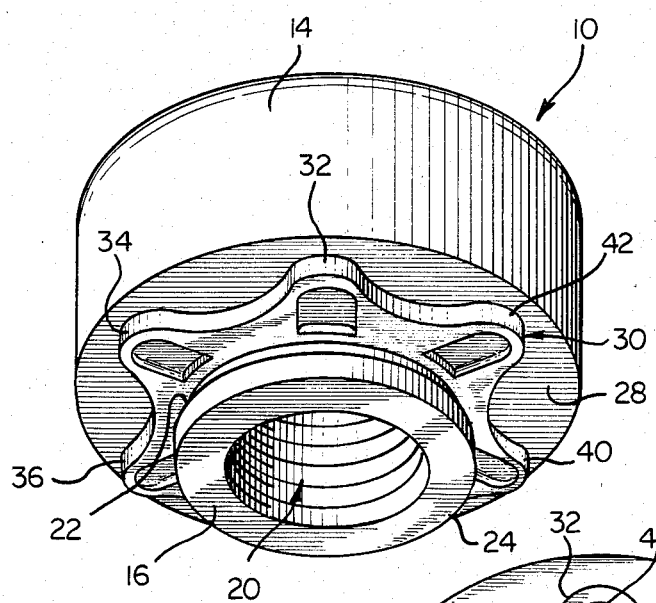
FIG. 1 is a perspective view showing one embodiment of a clinch-type fastener in accordance with the invention.
Figure 4:
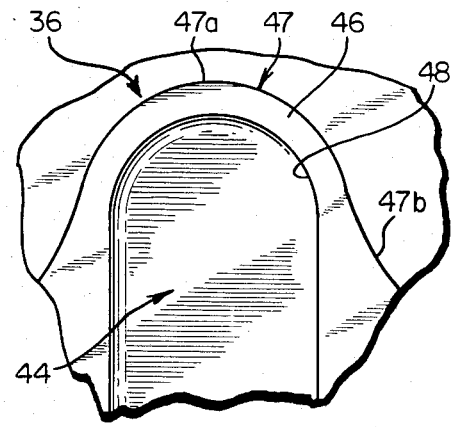
FIG. 4 is an enlarged partial plan view of a portion of the fastener of FIGS. 1 and 2.

Referring now to the drawings, a self-clinching or clinch type fastener in accordance with the invention is designated generally by the reference numeral 10. This fastener 10 is particularly useful in conjunction with a workpiece comprising a relatively thin sheet material, as indicated in FIGS. 7 and 8 by reference numeral 12. The fastener 10 includes a head section or portion 14 and a shank section or portion 16 projecting from the head 12 and defining generally an axis 18 (see FIG. 7). In the illustrated embodiment, an internally threaded fastener is illustrated, having internal threads designated by reference numeral 20. It will be appreciated that the fastener 10 may comprise an externally threaded fastener, having an elongate shank portion with an external thread thereon, without departing from the scope of the invention.

In accordance with the invention, a groove 22 is formed in the shank 16. In operation, as best seen in FIG. 8, the head 14 is embedded in the sheet material 12 to displace material thereof into the groove 22, to thereby form a mechanical interlock between the sheet material and the fastener 10. In this regard, the groove 22 will be seen to be radially inwardly extending with respect to the shank 16.

An extruding portion 24 is disposed axially forward of the groove 22. In operation, this extruding portion is utilized for reshaping or sizing an aperture 26 in the workpiece or sheet material 12 (see FIG. 7) preparatory to the clinching operation, wherein material is forced into groove 22. In this regard, the aperture 26 is preferably preformed or prepunched in sheet 12 to a generally smaller dimension or diameter than shank 16 or indeed than groove 22.

The enlarged diameter extruding portion 24 of the shank 16 thus opeates to cold work and resize the preformed sheet metal aperture 26 prior to completion of the clinching operation. Hence, aperture 26 is enlrged by passage of extruding portion 24 therethrough during the clinching oepation. The enlarged or final aperture is indicated in FIG. 8 by reference numeral 26a.

The extruding portion 24 of the illustrated embodiment will be seen to define a generally cylindrical surface which thus provides a smooth, cylindrical continuous periphery for the extruding portion and also defines the maximum diameter thereof. If desired, the portion 24 may be frustoconical, as its shape depends to some extent upon the thickness and hardness of the material 12. While the extruding portion 24 is desirable it is not essential to the present invention.

The maximum diameter of portion 24 is selected to be greater than the diameter of initial aperture 26 in the sheet material 12. Accordingly, upon engagement of the extruding portion 24 with the sheet material, the aperture will be resized to correspond to portion 24. Formed on shank 16 intermediate extruding section 24 and head 14 is the locking groove 22, into which material will be forced during the clinching opeation to achieve the desired mechanical interlock. Preparatory to the clinching operation, the resized aperture 26 will closely overlie the shank 16 and the groove 22. A portion of the head 14 is seated or embedded in the upper surface of the sheet material 12 during the clinching opeation and, as indicated above, this seating displaces material of the workpiece 12 into the locking groove 22 to interlock the fastener with the workpiece. The close overlap of the resized aperture 26 with respect to groove 22 will serve to direct the displaced material into the groove.

In accordance with the invention, a material displacing portion or section of the head 14, designated generally be reference numeral 30, is formed on undersurface 28 thereof. Preferably, this material displacing portion 30 is of a noncircular design. It is this section 30 which embeds in the sheet material 12. Due to the noncircular shape of this section 30, the embedding thereof in the sheet material 12 forms a second mechanical interlock, that is, an interlock preventing relative rotation of the fastener 10 with respect to the sheet material 12.

In the embodiment illustrated, this noncircular displacing portion or section 30 comprises a plurality of radially disposed projections or lobes 32, 34, 36, 38, 40 and 42, which in the illustrated embodiment are six in numer. Fewer or more such projections may be utilized without departing from the invention. Moreover, in the illustrated embodiment, these projections 32, 34, etc. are axially raised or projecting with respect to flat undersurface 28 of the head 14 and extend in a radial direction generally intermediate this undersurface and the groove 22.

In accordance with an important feature of the invention, each of these projections 32, etc. includes axial facing recesses 44 formed therein. The recesses 44 enable the projections 32, etc. to be fully formed during the fabrication of the head 14 of fastener 10. That is to say the die portions which define the recesses 44 will cold form the material of the head to assure complete filling of the radially outer periphery of each projection 32, etc. Preferably, the volume of the projections 32, etc. and any other portion of the head embedded in the workpiece are sized such that the net volume of material displaced by the projections, taking into account the recesses therein, is substantially equal to the volume of the groove 22. Accordingly, upon the embedding of the head 14 in the workpiece or sheet material 12, the material of the workpiece is displaced into the groove 22 by the projections 32, 34, etc. such that the groove is filled about its entire periphery.

Referring now more particularly to the drawings, it will be seen that the projections 32, 34, etc. comprise a series of radial projections raised axially above the undersurface 28 of the head, each including recesses 44 generally radially inwardly thereof. More particularly, these radial projections 32, 34, etc. and associated recessed portions or recesses 44 etc. are generally defined by a raised ridge-like structure 46 about the undersurface 28 of the head. This ridge 46 provides an undulating non-circular radially outer edge surface 47 which defines the outer radial extent of the projections. The ridge 46 also defines a series of inner surfaces 48 which provide the wall portions of the axial recesses 44.

Figure 2:
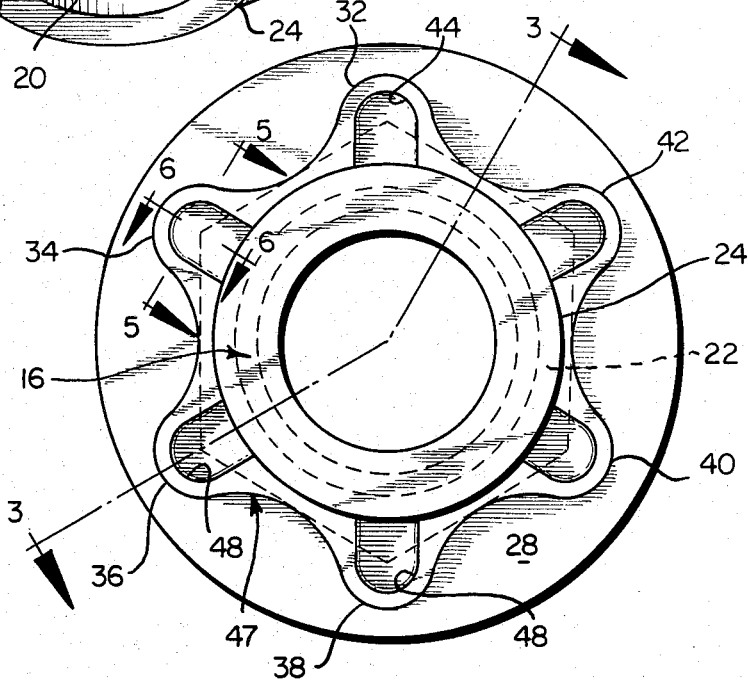
FIG. 2 is a bottom plan view of the fastener of FIG. 1.
Figure 3:
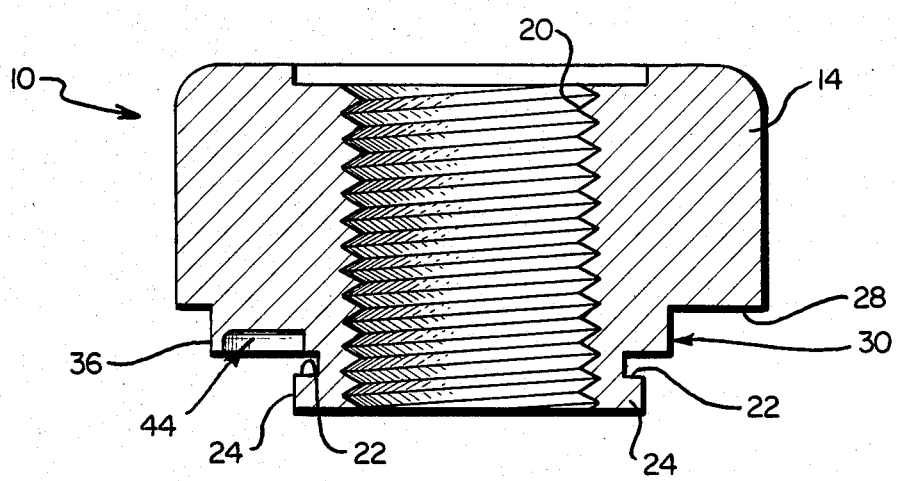
FIG. 3 is a sectional view taken generally along the line 3—3 of FIG. 2.

Still more particularly, the radial projections or lobes 32, 34, etc. are located such that the centers of the curved surface portions 47 are located at the corners of a regular hexagon, as indicated by dotted outline in FIG. 2. The curved surface portion 47, as can be seen in FIG. 2, is in fact made up of a two series of alternating curved sections 47a and 47b. The first series 47a are convexed radially outwardly and define the radially outer portions of each lobe. The second series 47b are oppositely, or radially concaved, and merge smoothly with the first series 47a to define radially inner portion of the lobe structure 32, 34, etc. It will be noted that the particular configuration of the lobes 32, 34, etc. is similar to that as disclosed in more specific detail in U.S. Pat. Nos. 3,584,667 and 3,967,699, to which reference is invited. Hence, as previously indicated, upon seating of the head 14 relative to the sheet of material, these undulating or alternating lobes 32, 34, etc. resist rotation of the fastener 10 relative the sheet material 12.

With the present invention improved torque resistance is obtained over the design as shown in U.S. Pat. No. 3,967,699. This results from several factors. With the present design it is assured that all of the lobes 32, 34, etc. will be completely formed and will be available to resist undesired rotation of the fastener. As mentioned above, with the prior art design, quite often the lobes are underfilled or incompletely formed during the cold heading fabrication step, a problem especially troublesome with respect to relatively small fasteners. Further, upon assembly of the fastener 10, a portion of the sheet material 12 will be cold formed and caused to flow into and fill the recesses 44 provided in each lobe 32, 34, etc. Thus, in addition to the exterior surfaces 47 of each lobe, the interior surfaces 48 of the recesses 44 are also available to provide torque resistance.

As previously indicated, FIGS. 7 and 8 illustrate the steps of assembly of the fastener 20 with a relatively thin sheet material section 12. Looking first to FIG. 7, the sheet material 12 is provided with an initial aperture 26 of smaller diameter than the extruding portion 24. The apertured sheet material 12 is placed on top of a stationary die assembly comprised of a first, recessed die section 60 and a second die member 62 carried within the recessed member 60. In the illustration, the die members are shown in a generally schematic form.

After initial positioning of the fastener 10 relative to initial aperture 26, a cooperating die or punch tool 64 is engaged with the fastener 10. Preferably, the tool 64 is provided with elongate shank portion 66 sized to fit without interference within the threads 20 of fastener 10 and a following shoulder portion sized to abut the top surface of fastneer 10 about the opening of the thread 20 thereto. The tool 64 is advanced relative to the dies 60, 62 so as to move from the condition of FIG. 7 to the condition of FIG. 8. During this movement, the extruding portion 24 of the fastener will be brought into engagement with the sheet material disposed about the aperture 26 and will cold work this material, as generally indicated in FIG. 8, so as to resize initial aperture 26 to provide the final aperture 26a of slightly increased diameter. It will be noted that this extruding action also causes the material of the sheet about aperture 26a to be displaced somewhat inwardly with respect to die 60, generally reaching a stop or abutment surface provided by the upper surface of die member or portion 62.

After the resizing operation, the final aperture 26a will be seen to be in close sliding contact with the extruding portion 24 and will closely overlie the groove 22. Accordingly, there is little or no play between the material of aperture 26a and fastener 10, such that substantially all the material displaced upon subsequent engagement of the material displacing section 30 with the sheet 12, will flow inwardly into the locking groove 22.

Hence, looking to FIG. 8, the clinching operation is illustrated in its completed form. That is, the head 14 has now been completely seated, with the portion 30 embedded in the upper surface of the sheet material 12.

As the projections or lobes of section 30 are embedded in the upper surface, the material of the sheet 12 about the aperture 26a is trapped by the extruding portion 24 interiorly by the head undersurface 28 and die member 62 axially and by die member 60 exteriorly. Accordingly, the material displaced by the projections of section 30 as they are embedded in the sheet material has no place to flow but radially inwardly into the locking groove 22 and upwardly into the recesses 44, thus forming a tight mechanical connection.

Accordingly, the strength of the mechanical interlock thus obtained can be predicted and controlled in order to insure against backing out of the fastener 10 with respect to sheet 12 under operating conditions, as for exampke, when a complementary threaded fastener is engaged utilizing a power tool or the like. It should also be recalled in this regard, that the lobes or projections 32, 34, etc. of portion 30 embed themselves inthe sheet material to result in a further interlock preventing relative rotation between fastener 10 and sheet material 12, for example, in response to torque applied by sucha power tool to a mating fastener.

In view of the foregoing description, it will be seen that the amount of material displaced by the head 14 and more particularly the projections or lobes of section 30 thereof can be calculated and controlled by the design of the section 30. Preferably, and assuming the hexagonal configuration provided to the lobes or projections as indicated in FIG. 2 and described above, the net volume of the material deforming portion 30 will be substantially equal to the volume defined by the groove 22, that is, radially inwardly of the outer diameter defined by extruding portion 24 and axially intermediate upper surface of extruding portion 24 and facing lower surface of the section 30. Moreover, it will be apparent from the foregoing that some of the material of the sheet 12 will flow into and fill the recesses 44 thus further enhancing the resulting interlock against relative rotation between the fastener 10 and the sheet material 12.

While in particular embodiment of the invention has been shown and described in detail, it will be obvious to those skilled in the art that changes and modifications of the present inention, in its various aspects, may be made without departing from the invention in its broader aspects, some of which changes and modifications being matters of routine engineering or design, and others being apparent only after study. As such, the scope of the invention is limited by the particular embodiment and specific construction described herein but is defined by the appended claims and equivalents thereof. Accordingly, the aim in the appended claims is to cover all such changes and modifications as fall within the true spirit and scope of the invention.

The invention is claimed as follows:

1. A self-clinching fastener of the type for connection to a section of sheet material, said fastneer including a head and a shank portion, with a groove formed in said shank portion, with said head including a material deforming portion embeddable ins aid sheet material to displace material thereof into said groove to form a mechanical interlock between said sheet material and said fastener, and said material deforming portion includng a plurality of radially disposed projections extending axially outward of an undersurface of said head and intermediate said undersurface and said groove, each said projection including an axially facing discrete recess formed therein, a convexed peripheral portion of each said radial projection and a wall portion of said recess associated with said radial projection being defined by a raised ridge on the undersurface of said head, said recess being disposed inwardly of the periphery of said projection and intermediate said periphery and the shank portion, such that the material of the workpiece being displaced will flow into said groove and into the recesses in said projections, with the radial projections and the wall portions of the recesses locking the fastener against rotative movement, and with the material flowing into said groove locking the fastener against axial movement, and the location of said recess assuring complete formation of the projectios during fabrication.

2. A self-clinching fastener according to claim 1 wherein said projections are defined by a first series of curved surfaces and a second series of surfaces curved oppositely of said first series and alternating therewith while merging with said first series, said projections serving, upon being embedded in said sheet material and upon seating of said head, to resist relative rotation of said fastener with respect to said sheet material.

3. A self-clinching fastener according to claim 1 further including an extuding portion disposed axially forward of the groove to resize an aperture formed in said sheet material, prior to embedding of said material deforming portion therein.

4. A self-clinching fastener according to claim 3 wherein said extruding portion has a cylindrical surface which provides a smooth, cylindrical continuous periphery for said extruding portion and which also defines the maximum diameter thereof, said maximum diameter being selected to be greater than the diameter of an aperture in said sheet material, whereby upon engagement of said extruding portion with said sheet material, said aperture will be resized to approximately said maximum diameter.

5. In combination, a section of apertured sheet material and a threaded self-clinching fastener engaged therewith, said fastener including a head and a shank portion, with a groove formed in said shank portion, said head including a material deforming portion embeddable in said sheet material to displace material therefrom into said groove to form a mechancal interlock between said sheet material and said fastener, said shank further including an extruding section of a diameter greater than the initial diameter of the aperture formed in said sheet material, such that upon engagement of said fastener with said sheet material, said extruding section will resize said initial aperture preparatory to the seating of said head, said material deforming portion including a plurality of radially disposed projections extending axially outward of the undersurface of said head and intermediate said undersurface and said peripheral groove, each said projection including an axially facing recess formed therein, a convex peripheral portion of each said radial projection and a wall portion of the recess associated with each projection being defined by a raised ridge on the undersurface of said head, said recess being disposed inwardly of the periphery of said projection and intermediate said projectio periphery and the shank portion, said recesses assuring complete formation of the projections during fabrication, and also allowing the material of the workpiece being displaced upon embedding of said material deforming portion in said workpiece to flow into said groove to lock the fastener against axial movement, said material flowing into the recesses in said projections, with the radial projections and the wall portions of the recesses looking the fastener against rotative movement.

6. The combination according to claim 5 wherein said projections are defined by a first series of arcuately curved surface and a second series of surfaces curved oppositely of said first series and alternating therewith while mergin smoothly with said first series, said projections serving, upon being embedded insaid sheet material and upon seating of said head, to resist relative rotation of said fastener with respect to said sheet material.

7. The combination according to claim 5 wherein said extruding portion has a cylindrical surface which provides a smooth, cylindrical continuous periphery for said extruding portion and which also defines the maximum diameter thereof, said maximum diameter being selected to be greater than the diameter of an aperture in said sheet material, whereby upon engagement of said extruding portion with said sheet material, said aperture will be resized to approximately said maximum diameter.

* * * * *